United States Patent
Claus et al.

(10) Patent No.: US 7,978,886 B2
(45) Date of Patent: Jul. 12, 2011

(54) SYSTEM AND METHOD FOR ANATOMY BASED RECONSTRUCTION

(75) Inventors: Bernhard Erich Hermann Claus, Niskayuna, NY (US); Frederick Wilson Wheeler, Niskayuna, NY (US); Mark Lewis Grabb, Burnt Hills, NY (US); Cynthia Elizabeth Landberg, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1550 days.

(21) Appl. No.: 11/239,830

(22) Filed: Sep. 30, 2005

(65) Prior Publication Data

US 2007/0076928 A1     Apr. 5, 2007

(51) Int. Cl.
*G06K 9/00* (2006.01)
(52) U.S. Cl. ...................................................... 382/128
(58) Field of Classification Search .................. 382/22, 382/128, 174, 195, 4, 132, 154, 173, 190
See application file for complete search history.

(56) References Cited

U.S. PATENT DOCUMENTS

| | | | | |
|---|---|---|---|---|
| 4,903,204 | A | 2/1990 | Dobbins, III | 364/413.24 |
| 5,229,934 | A * | 7/1993 | Mattson et al. | 600/425 |
| 6,072,496 | A * | 6/2000 | Guenter et al. | 345/419 |
| 6,088,061 | A * | 7/2000 | Katata et al. | 348/390.1 |
| 6,292,530 | B1 | 9/2001 | Yavus et al. | 378/22 |
| 6,707,878 | B2 | 3/2004 | Claus et al. | 378/22 |
| 6,904,121 | B2 | 6/2005 | Claus et al. | 378/21 |
| 2002/0006216 | A1* | 1/2002 | Armato et al. | 382/131 |
| 2003/0035507 | A1* | 2/2003 | Hsu et al. | 378/4 |
| 2005/0002550 | A1* | 1/2005 | Jabri et al. | 382/131 |
| 2005/0163278 | A1* | 7/2005 | Metz et al. | 378/4 |
| 2009/0252395 | A1* | 10/2009 | Chan et al. | 382/131 |
| 2010/0021031 | A1* | 1/2010 | Brockway et al. | 382/128 |

OTHER PUBLICATIONS

Liu, L.; Stamos, I., "Automatic 3D to 2D registration for the photorealistic rendering of urban scenes," Computer Vision and Pattern Recognition, 2005. CVPR 2005. IEEE Computer Society Conference on , vol. 2, no., pp. 137-143 vol. 2, Jun. 20-25, 2005 URL: http://ieeexplore.ieee.org/stamp/stamp.jsp?arnumber=1467433 &isnumber=31473.*

Bernhard E.H. Claus, Jeffrey W. Eberhard, "A New Method for 3D Reconstruction in Digital Tomosynthesis", Published in Proc. of SPIE vol. 4684, Medical Imaging 2002—Image Processing, ( 11 Pages).

Stevens, G.M., Fahrig, R., Pelc, N.J., "Filtered Backprojection for Modifying the Impulse Response of Circular Tomosynthesis", Med. Phys. 28(3), pp. 372-380, Am. Assoc. Phys. Med., Mar. 2001.

Lauritsch, G., Haerer, W.H., "A Theoretical Framework for Filtered Backprojection in Tomosynthesis", SPIE vol. 3338, pp. 1127-1137, Part of the SPIE Conference on Image Processing, Feb. 1998.

Dean Verhoeven, "Limited-Data Computed Tomography Algorithms for the Physical Sciences", Applied Optics, vol. 32, No. 20, pp. 3736-3754, Jul. 1993.

(Continued)

*Primary Examiner* — Brian P Werner
*Assistant Examiner* — Nirav G Patel
(74) *Attorney, Agent, or Firm* — Scott J. Asmus (57) ABSTRACT

A technique is provided for performing diagnosis and/or analysis of a volumetric image generated via anatomy based reconstruction. The technique includes generating a three-dimensional image by reconstructing a plurality of residual projection images from which a contribution of one or more structures of interest has been removed. The technique also includes evaluating the three-dimensional image and/or the plurality of residual projection images to generate a diagnosis.

29 Claims, 5 Drawing Sheets

OTHER PUBLICATIONS

Matsuo, H., Iwata, A., Horiba, I., Suzumura, N., "Three-Dimensional Image Reconstruction by Digital Tomo-Synthesis Using Inverse Filtering", IEEE Trans. Med. Imaging, vol. 12, No. 2, Jun. 1993.

Kolitsi, Z., Panayiotakis, G., Pallikarakis, N, "A Method for Selective Removal of Out-Of-Plane Structure in Digital Tomosynthesis", Med. Phys., vol. 20, No. 1, pp. 47-50, 1993.

Ruttiman, U., Groenhuis, R., Webber, R., "Restoration of Digital Multi-Plane Tomosynthesis by a Constrained Iteration Method", IEEE Trans. Med. Imaging, vol. MI-3, pp. 141-148, Sep. 1984.

David G. Grant, "Tomosynthesis: A Three-Dimensional Radiographic Imaging Technique", IEEE Trans. Biomed. Eng, vol. BME-19, No. 1, Jan. 1972.

* cited by examiner

SYSTEM AND METHOD FOR ANATOMY BASED RECONSTRUCTION

BACKGROUND

The invention relates generally to the field of non-invasive imaging and more specifically to the field of limited angle tomographic imaging, and the field of tomographic imaging with few projections. In particular, the present invention relates to anatomy based reconstruction techniques for use in limited angle tomographic imaging and tomographic imaging with few projections.

Digital tomosynthesis is a three-dimensional X-ray imaging technique, where typically few projection radiographs are acquired for varying positions of an X-ray source relative to the imaged object. The detector is positioned generally opposite of the X-ray source and may be stationary in certain embodiments. From the plurality of projection images, data representative of 3D structures within the imaged object can be created using a suitable reconstruction algorithm. However, reconstruction of the imaged object is difficult due to incomplete information (i.e., the absence of densely spaced projections over the full angular range).

A basic shift-and-add algorithm and/or a simple backprojection algorithm are direct reconstruction methods used to generate tomographic images that exhibit a relatively poor image quality, with low contrast and a significant artifact level. Other advanced direct reconstruction techniques, as well as iterative reconstruction techniques, may be employed with the goal of improving image quality. For example, ART (algebraic reconstruction technique), which is an iterative update of the simple backprojection reconstruction that enforces the reprojection consistency constraint is one such technique. With ART, a re-projection of the final reconstructed 3D dataset for one of the considered projection angles is substantially identical to the true projection image at that angle. ART and similar iterative methods include approaches where a first reconstruction is obtained using a direct reconstruction method (generally using simple backprojection), which is then improved in subsequent steps by iteratively updating the reconstructed three-dimensional dataset using information about the difference between original projection image and reprojected three-dimensional dataset. However, the current tomosynthesis reconstruction techniques are not very effective in addressing problems such as efficient separation of overlying tissue, enhancement of the contrast, particularly of small structures, and minimization of artifacts.

It is therefore desirable to provide an improved reconstruction technique that efficiently separates the overlying tissue, provides better contrast and minimizes artifacts.

BRIEF DESCRIPTION

Briefly in accordance with one aspect of the technique, a method is provided for anatomy based reconstruction. The method provides for identifying one or more structures of interest in a plurality of projection images, generating a plurality of residual projection images based on the one or more structures of interest, and reconstructing a residual volume from the plurality of residual projection images. Processor-based systems and computer programs that afford functionality of the type defined by this method may be provided by the present technique.

In accordance with another aspect of the present technique, a method is provided for performing diagnosis and/or analysis. The method provides for generating a three-dimensional image by reconstructing a plurality of residual projection images from which a contribution of one or more structures of interest has been removed and evaluating the three-dimensional image to generate a diagnosis. Processor-based systems and computer programs that afford functionality of the type defined by this method may be provided by the present technique.

In accordance with a further aspect of the present technique, a method is provided for performing diagnosis and/or analysis. The method provides for generating a plurality of residual projection images by removing a contribution of one or more structures of interest from a plurality of respective projection images and evaluating the plurality of residual projection images to generate a diagnosis. Processor-based systems and computer programs that afford functionality of the type defined by this method may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to anatomy based reconstruction techniques for use in limited angle imaging, such as tomosynthesis, or for use in other imaging techniques, such as computed tomography (CT). Though the present discussion provides examples in a medical imaging context, one of ordinary skill in the art will readily apprehend that the application of these techniques in other contexts, such as for industrial imaging, security screening, and/or baggage or package inspection, is well within the scope of the present techniques.

Figure 1:
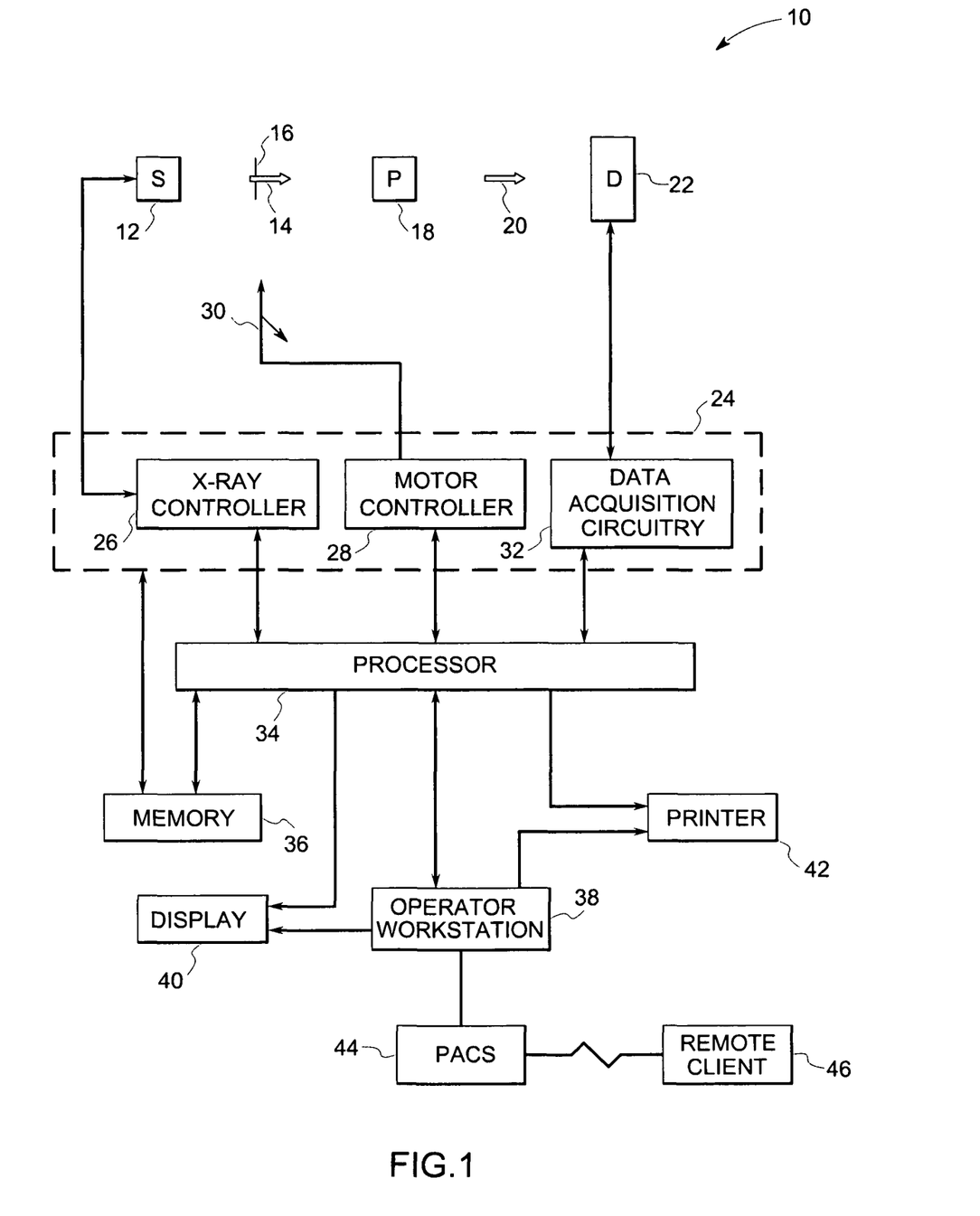
FIG. 1 is a diagrammatical representation of an exemplary imaging system, in this case a tomosynthesis system for producing processed images in accordance with aspects of the present technique.

FIG. 1 is a diagrammatical representation of an exemplary imaging system, for acquiring, processing and displaying images in accordance with the present technique. In accordance with a particular embodiment of the present technique, the imaging system is a tomosynthesis system, designated generally by the reference numeral 10, in FIG. 1. However, it should be noted that any multiple projection imaging system may be used for acquiring, processing and displaying images in accordance with the present technique. As used herein, "a multiple projection imaging system" refers to an imaging system wherein multiple projection images may be collected at different angles relative to the imaged anatomy, such as, for example, tomosynthesis systems, PET systems, CT systems and X-ray C-Arm systems.

In the illustrated embodiment, tomosynthesis system 10 includes a source 12 of X-ray radiation 14, which is movable generally in a plane, or in three dimensions. In the exemplary embodiment, the X-ray source 12 typically includes an X-ray tube and associated support and filtering components. A collimator 16 may be positioned adjacent to the X-ray source 12. The collimator 16 typically defines the size and shape of the X-ray radiation 14 emitted by X-ray source 12 that pass into a region in which a subject, such as a human patient 18, is positioned. A portion of the radiation 20 passes through and around the subject, and impacts a detector array, represented generally by reference numeral 22.

The detector 22 is generally formed from a plurality of detector elements, which detect the X-rays 20 that pass through or around the subject. For example, the detector 22 may include multiple rows and/or columns of detector elements arranged as an array. Each detector element, when impacted by X-ray flux, produces an electrical signal that represents the integrated energy of the X-ray beam at the position of the element between subsequent signal readout of the detector 22. Typically, signals are acquired at one or more view angle positions around the subject of interest so that a plurality of radiographic views may be collected. These signals are acquired and processed to reconstruct an image of the features within the subject, as described below.

The source 12 is controlled by a system controller 24 which furnishes both power and control signals for tomosynthesis examination sequences, including position of the source 12 relative to the subject 18 and detector 22. Moreover, the detector 22 is coupled to the system controller 24, which commands acquisition of the signals generated by the detector 22. The system controller 24 may also execute various signal processing and filtration functions, such as for initial adjustment of dynamic ranges, interleaving of digital image data, and so forth. In general, the system controller 24 commands operation of the tomosynthesis system 10 to execute examination protocols and to process acquired data. In the present context, the system controller 24 may also include signal processing circuitry, typically based upon a general purpose or application-specific digital computer, and associated memory circuitry. The associated memory circuitry may store programs and routines executed by the computer, configuration parameters, image data, and so forth. For example, the associated memory circuitry may store programs or routines for implementing the present technique.

In the embodiment illustrated in FIG. 1, the system controller 24 includes an X-ray controller 26, which regulates generation of X-rays by the source 12. In particular, the X-ray controller 26 is configured to provide power and timing signals to the X-ray source 12. A motor controller 28 serves to control movement of a positional subsystem 30 that regulates the position and orientation of the source with respect to the subject 18 and detector 22. The positional subsystem 30 may also cause movement of the detector, or even the patient, rather than or in addition to the source 12. It should be noted that in certain configurations, the positional subsystem 30 may be eliminated, particularly where multiple addressable sources are provided. In such configurations, projections may be attained through the triggering of different sources of X-ray radiation positioned accordingly. Similarly, the system may comprise a plurality of detectors that may be activated or read-out concurrently, or may be activated or read-out in synchronization with and as a function of the position of the triggered source. Further, the system controller 24 may comprise data acquisition circuitry 32. In this exemplary embodiment, the detector 22 is coupled to the system controller 24, and more particularly to the data acquisition circuitry 32. The data acquisition circuitry 32 receives data collected by readout electronics of the detector 22. The data acquisition circuitry 32 typically receives sampled analog signals from the detector 22 and converts the data to digital signals for subsequent processing by a processor 34. Such conversion, and indeed any preprocessing, may actually be performed to some degree within the detector assembly itself.

The processor 34 is typically coupled to the system controller 24. Data collected by the data acquisition circuitry 32 may be transmitted to the processor 34 for subsequent processing and reconstruction. The processor 34 may comprise or communicate with a memory 36 that can store data processed by the processor 34 or data to be processed by the processor 34. It should be understood that any type of computer accessible memory device suitable for storing and/or processing such data and/or data processing routines may be utilized by such an exemplary tomosynthesis system 10. Moreover, the memory 36 may comprise one or more memory devices, such as magnetic or optical devices, of similar or different types, which may be local and/or remote to the system 10. The memory 36 may store data, processing parameters, and/or computer programs comprising one or more routines for performing the processes described herein. Furthermore, memory 36 may be coupled directly to system controller 24 to facilitate the storage of acquired data.

The processor 34 is typically used to control the tomosynthesis system 10. The processor 34 may also be adapted to control features enabled by the system controller 24, i.e., scanning operations and data acquisition. Furthermore, the processor 34 is configured to receive commands and scanning parameters from an operator via an operator workstation 38, typically equipped with a keyboard, mouse, and/or other input devices. Thus, the operator may observe the reconstructed image and other data relevant to the system from operator workstation 38, initiate imaging, and so forth. Where desired, other computers or workstations may perform some or all of the functions of the present technique, including post-processing of image data accessed from memory device 36 or another memory device at the imaging system location or remote from that location.

A display 40 coupled to the operator workstation 38 may be utilized to observe the reconstructed image. Additionally, the reconstructed image may be printed by a printer 42 coupled to the operator workstation 38. The display 40 and the printer 42 may also be connected to the processor 34, either directly or via the operator workstation 38. Further, the operator workstation 38 may also be coupled to a picture archiving and communications system (PACS) 44. It should be noted that PACS 44 might be coupled to a remote system 46, such as a radiology department information system (RIS), hospital information system (HIS) or to an internal or external network, so that others at different locations may gain access to the image data.

It should be further noted that the processor 34 and operator workstation 38 may be coupled to other output devices, which may include standard or special-purpose computer monitors, computers and associated processing circuitry. One or more operator workstations 38 may be further linked in the system for outputting system parameters, requesting examinations, viewing images, and so forth. In general, displays, printers, workstations and similar devices supplied within the system may be local to the data acquisition components or, may be remote from these components, such as elsewhere within an institution or hospital, or in an entirely different location, linked to the imaging system via one or more configurable networks, such as the Internet, virtual private networks, and so forth.

Figure 2:
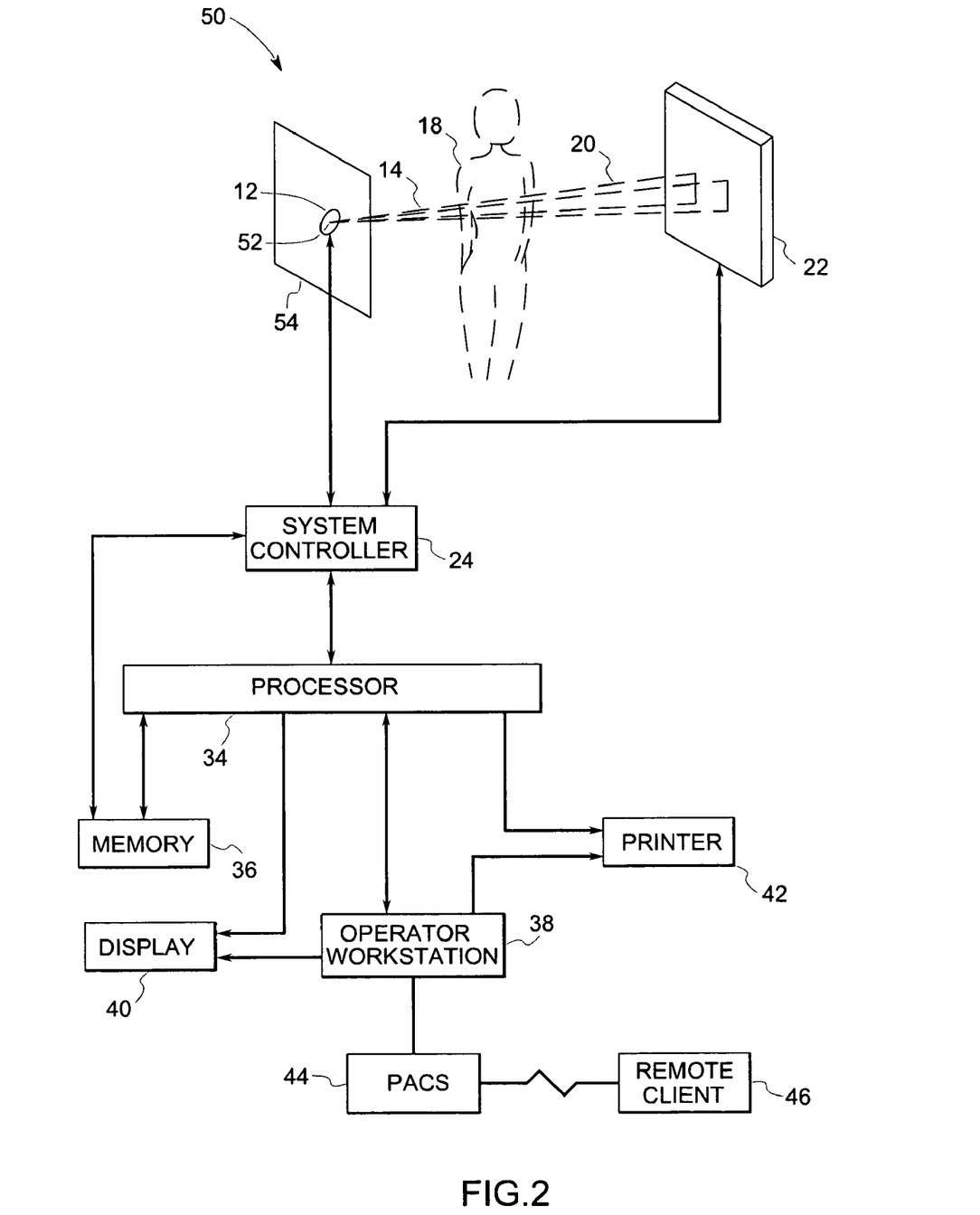
FIG. 2 is a diagrammatical representation of a physical implementation of the system of FIG. 1.

Referring generally to FIG. 2, an exemplary implementation of a tomosynthesis imaging system of the type discussed with respect to FIG. 1 is illustrated. As shown in FIG. 2, an imaging scanner 50 generally permits interposition of a subject 18 between the source 12 and detector 22. Although a space is shown between the subject and detector 22 in FIG. 2, in practice, the subject may be positioned directly before the imaging plane and detector. The detector 22 may, moreover, vary in size and configuration. The X-ray source 12 is illustrated as being positioned at a source location or position 52 for generating one of a series of projections. In general, the source is movable to permit multiple different projections to be attained in an imaging sequence. In the illustration of FIG. 2, a source plane 54 is defined by the array of potential emission positions available for source 12. The source plane 54 may, of course, be replaced by three-dimensional trajectories for a source movable in three-dimensions. Alternatively, two-dimensional or three-dimensional layouts and configurations may be defined for multiple sources, which may or may not be independently movable.

In typical operation, X-ray source 12 emits an X-ray beam from its focal point toward detector 22. A portion of the beam 14 that traverses the subject 18, results in attenuated X-rays 20 which impact detector 22. This radiation is thus attenuated or absorbed by the internal structures of the subject, such as internal anatomies in the case of medical imaging. The detector is formed by a plurality of detector elements generally corresponding to discrete picture elements or pixels in the resulting image data. The individual pixel electronics detect the intensity of the radiation impacting each pixel location and produce output signals representative of the radiation. In an exemplary embodiment, the detector consists of an array of 1024×1024 pixels, with a pixel size of 200×200 μm. Other detector functionalities, configurations, and resolutions are, of course, possible. Each detector element at each pixel location produces an analog signal representative of the impending radiation that is converted to a digital value for processing.

Source 12 is moved and triggered, or distributed sources are similarly triggered at different locations, to produce a plurality of projections or images from different source locations. These projections are produced at different view angles and the resulting data is collected by the imaging system. In an exemplary embodiment, the source 12 is positioned approximately 180 cm from the detector, in a total range of motion of the source between 31 cm and 131 cm, resulting in a 5° to 20° movement of the source from a center position. In a typical examination, many such projections may be acquired, typically a hundred or fewer, although this number may vary.

Data collected from the detector 22 then typically undergo correction and pre-processing to condition the data to represent the line integrals of the attenuation coefficients of the scanned objects, although other representations are also possible. The processed data, commonly called projection images, are then typically input to a reconstruction algorithm to formulate a volumetric image of the scanned volume. In tomosynthesis, a limited number of projection images are acquired, typically a hundred or fewer, each at a different angle relative to the object and/or detector. Reconstruction algorithms are typically employed to perform the reconstruction on this projection image dataset to produce the three-dimensional volumetric image of the imaged object or a part of the imaged object.

Once reconstructed, the volumetric image produced by the systems of FIGS. 1 and 2 reveals the three-dimensional characteristics and spatial relationships of internal structures of the subject 18. Reconstructed volumetric images may be displayed to show the three-dimensional characteristics of these structures and their spatial relationships. The reconstructed volumetric image is typically arranged in slices. In some embodiments, a single slice may correspond to structures of the imaged object located in a plane that is conventionally parallel to the detector plane, but reconstructing a slice in any orientation is possible. Though the reconstructed volumetric image may comprise a single reconstructed slice representative of structures at the corresponding location within the imaged volume, more than one slice image is typically computed. Alternatively, the reconstructed data may not be arranged in slices.

As will be appreciated by one skilled in the art, the volumetric images of the anatomy may be reconstructed via a variety of image reconstruction techniques. For example, the exemplary imaging system 10 may acquire and reconstruct image data by the techniques discussed herein, such as by an anatomy based image reconstruction technique. In particular, as will be appreciated by those of ordinary skill in the art, control logic and/or automated routines for performing the techniques and steps described herein may be implemented by the imaging system 10, either by hardware, software, or combinations of hardware and software. For example, suitable code may be accessed and executed by the processor 34 to perform some or all of the techniques described herein. Similarly application specific integrated circuits (ASICs) configured to perform some or all of the techniques described herein may be included in the processor 34 and/or the system controller 24.

Figure 3:
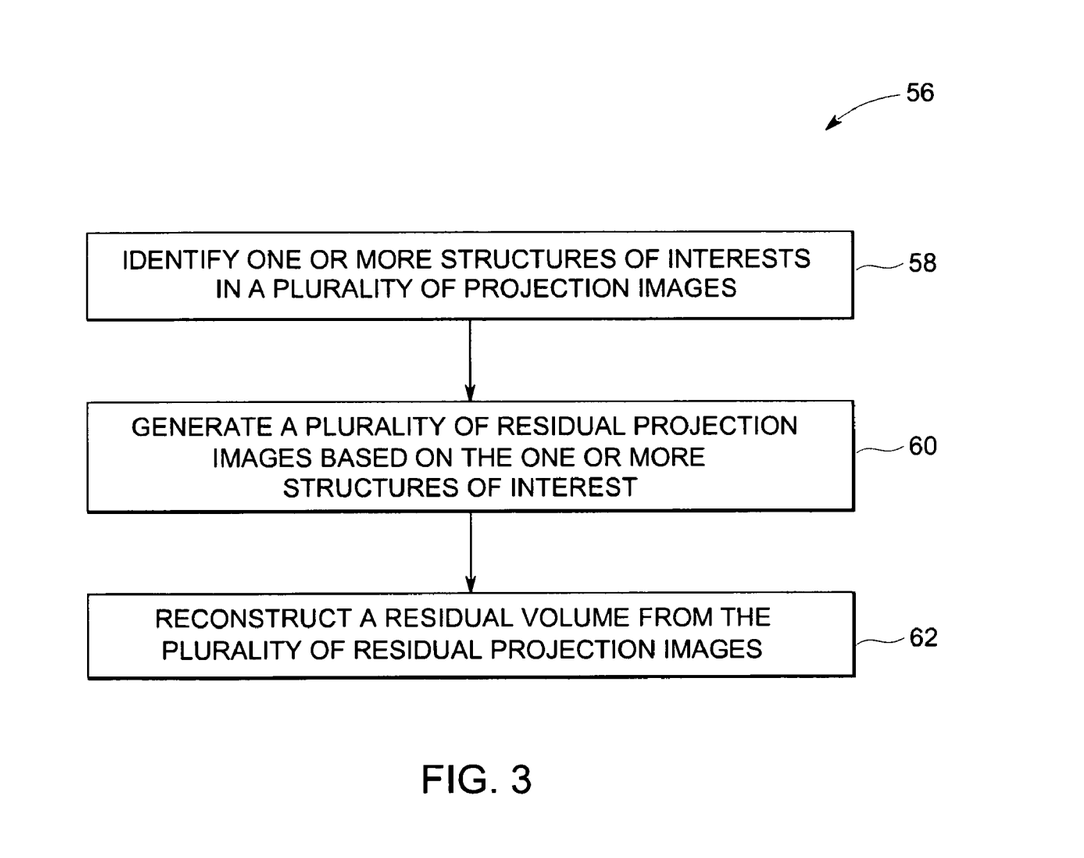
FIG. 3 is a flowchart illustrating an exemplary process for anatomy based reconstruction in accordance with one aspect of the present technique.

For example, referring now to FIG. 3, exemplary control logic 56 for generating volumetric images using the anatomy based image reconstruction techniques on a system such as imaging system 10 is depicted via a flowchart. As illustrated in the flowchart, exemplary control logic 56 includes the step of identifying one or more structures of interest in a plurality of projection images at step 58, generating a plurality of residual projection images based on the one or more identified structures of interest at step 60 and reconstructing a residual volume from the plurality of residual projection images at step 62. The structures of interest may, for example, be particular parts of the anatomy, or particular types of medical instruments such as tools or catheters, particular types of medical fiducial markers such as BB's, or multiple such structures that are handled simultaneously in one stage. A final reconstructed volume may be generated by combining the identified structures and the residual volume. Optionally the process 56 may be iterated for refining the residual and/or the final reconstructed volume. Iterating the process 56 may include identifying at least a second set of structures in the projection images, generating a second set of residual projection images that are corrected for the first and the second set of structures, and reconstructing a new residual volume from the second set of residual projection images.

Identification of the structures of interest in the projection images may include locating the structures in the projection images and characterizing them by estimating size, shape, orientation, attenuation and other characteristics of the structures. In one embodiment, the plurality of residual projection images are then generated by estimating contribution of the identified structures for each projection image and removing the respective contribution from the respective projection image. This may include using additional information from an atlas or prior information from other sources about characteristics of the structures. In one embodiment, the imaging modality or the imaging technique associated with the acquisition of the projection images may be accounted for while estimating the contribution of the structures of interest.

In certain embodiments, an initial reconstructed volume may be generated using two or more projection images. The structures of interest may be then identified within the initial reconstructed volume. For example, referring now to FIG. 4, exemplary control logic 64 for generating volumetric images using the anatomy based image reconstruction technique, where the structures are identified within the initial reconstructed volume, is depicted via a flowchart. As illustrated in the flowchart, exemplary control logic 64 includes the step of generating an initial reconstructed volume from the acquired projection images at step 66, identifying one or more structures of interest in the initial or a previously reconstructed volume at step 68, estimating contribution of the identified structures of interest to the projection images at step 70, and removing the respective contribution from each of the projection images to generate a plurality of residual projection images at step 72. It should be noted that, the initial reconstruction, which is used to identify structures within the reconstructed volume, may be generated using all or a subset of the available projection images. The control logic 64 further includes the step of reconstructing a residual volume from the generated residual projection images at step 74, and generating a final reconstructed volume by combining the identified structures of interest with the reconstructed residual volume at step 76. As will be appreciated by one skilled in the art, the control logic 64 may optionally update the final reconstructed volume by iterating the steps 68, 70, 72, 74 and 76, i.e., by identifying new structures of interest in the final reconstructed volume and from thereon proceeding to generate an updated final reconstructed volume. It should be noted that in the first iteration the previously reconstructed volume in step 68 is the initial reconstructed volume of step 66 while for subsequent iterations the previously reconstructed volume in step 68 is the final reconstructed volume at step 76 of the previous iteration.

Figure 5:
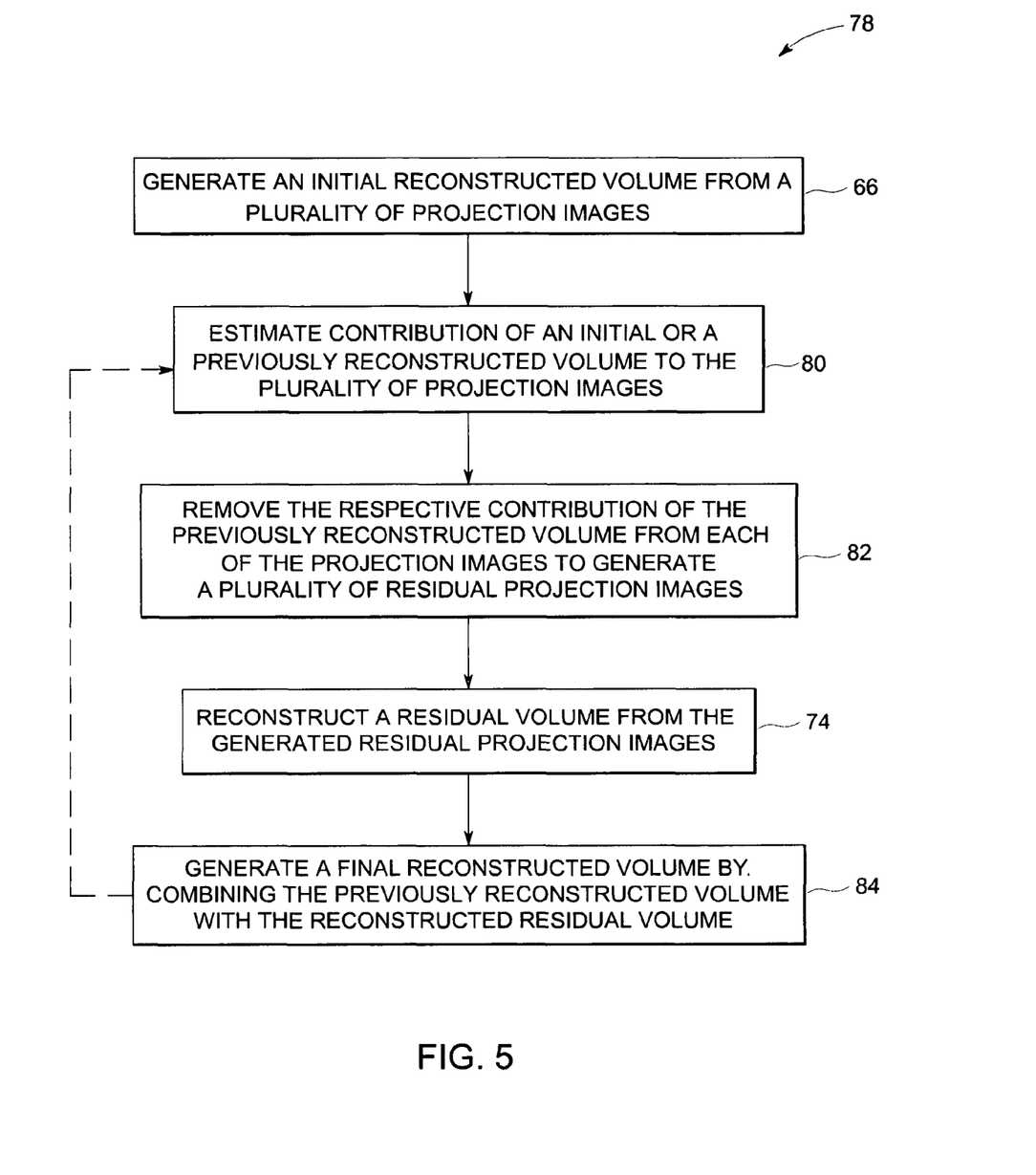
FIG. 5 is a flowchart illustrating a process for anatomy based reconstruction in accordance with a further aspect of the present technique.

Alternatively, in embodiments where the reconstruction method used in the initial reconstruction naturally emphasizes certain structures, a separate identification of the structures may not be necessary and the complete reconstructed volume may be retained after a suitable processing once the initial reconstructed volume is generated from the acquired projection images. As illustrated in FIG. 5, exemplary control logic 78 for generating volumetric images using the anatomy based image reconstruction techniques, where the complete reconstructed volume is retained, is depicted via a flowchart. The control logic 78 includes the step of generating an initial reconstructed volume from the acquired projection images at step 58, estimating contribution of the initial or a previously reconstructed volume to the projection images at step 80, and removing the respective contribution of the previously reconstructed volume from each of the projection images to generate a plurality of residual projection images at step 82. The control logic 78 further includes the step of reconstructing a residual volume from the generated residual projection images at step 74, and generating a final reconstructed volume by combining the previously reconstructed volume with the reconstructed residual volume at step 84. The reconstruction method employed to reconstruct the residual volume may be the same method as the one employed to reconstruct the initial volume, or it may be a different method. As described above, the control logic 78 may optionally update the final reconstructed volume by iterating the steps 80, 82, 74 and 84, i.e., by estimating contribution of the final reconstructed volume to the projection images and from thereon proceeding to generate an updated final reconstructed volume. As described earlier, the previously reconstructed volume in step 80 is the initial reconstructed volume of step 66 in the first iteration while for subsequent iterations the previously reconstructed volume in step 80 is the final reconstructed volume at step 84 of the previous iteration.

It should be noted that, when the structures are identified directly in the projection images as described above their 3D location may be estimated in a reconstruction process. As will be appreciated by one skilled in the art, structures, as used herein, refers not only to physical structures such as organs or bones, but also to "structures within the images". For example, an edge (a curve separating areas of high and low gray value) that is visible in a projection may cause artifacts in the reconstruction if not managed properly by the reconstruction method of the present invention. This edge may be due, for example, to the edge of a bone. However, to mitigate the impact in the reconstructed 3D image dataset, it may be sufficient to remove the edge from the one or more corresponding projection images. The method of the present invention is therefore not designed to only manage effects due to "real" 3D structures that are present in the imaged object, but also to manage effects that manifest themselves in the projections only, without having a real structural counterpart in the object.

The initial and/or residual reconstructed volume may be generated (such as by step 62 of FIG. 3 and steps 66 and 74 of FIGS. 4 and 5) from the projection images and/or residual projection images respectively by applying any suitable known reconstruction algorithm. Examples of such suitable algorithms include, but are not limited to, an order-statistics based backprojection (OSBP), filtered back projection (FBP) algorithm, generalized filtered backprojection (GFBP), weighted filtered backprojection (WFBP), a maximum a posteriori probability (MAP) algorithm, a maximum likelihood (ML) algorithm, an algebraic reconstruction technique (ART) algorithm, an entropy-based algorithm, a least squares (LS) algorithm, a penalized weighted least squares (PWLS) algorithm, a statistical reconstruction algorithm, an iterative reconstruction algorithm, and new anatomy-specific reconstruction algorithms designed specifically for this method. As will be appreciated by one skilled in the art, same or different reconstruction algorithm may be used in different stages. In certain embodiments, the projection images and/or residual projection images may be processed after acquisition or generation and prior to application of the reconstruction algorithm.

A reconstruction algorithm for generating the initial reconstructed volume may be selected to facilitate the identification of structures of interest or should naturally put an emphasis on these structures of interest, which in certain embodiments may be as a consequence of a filtering step that is part of the reconstruction. For example, if structures of high contrast are to be identified in step 68, such as calcifications and/or skin line in mammography or ribs in RAD, it may be appropriate to use a reconstruction algorithm that comprises a high-pass filtering element, thereby enhancing the edges of the high-contrast structures, optionally combined with an OSBP algorithm or other similar back projection algorithm, thereby minimizing out-of-plane artifacts due to the high-contrast structures, which in turn facilitates automatic identification or segmentation of the structures, such as step 68 of FIG. 4.

Identification of the structures of interest (such as by step 58 of FIG. 3 and step 68 of FIG. 4) may be performed, for example, by using segmentation, filtration, thresholding, quantization, edge detection, atlas-based registration or by other image processing techniques. Alternatively, in embodiments where the reconstruction naturally emphasizes certain structures, a separate identification of the structures may not be necessary and the complete reconstructed volume may be retained as described above. Further, the reconstructed volume maybe combined with an additional processing step, such as findings-based filtration, that further enhances certain structures. For certain anatomies, atlas-based or model based segmentation, or other methods that leverage prior information about the expected anatomical shape (e.g., orientation of the ribs in a RAD scan) or other characteristics of the imaged anatomy may be used. This step may also include a registration step such as 3D to 2D registration (e.g., registration of an atlas to projection images). Alternatively, for high-contrast structures, a simple thresholding operation may be sufficient. As will be appreciated by one skilled in the art, identification of structures may also be accomplished by image processing techniques that may be applied on one or more of the projection images before reconstruction. Identifying the structures of interest from the reconstructed volume may include identifying location, size, shape, orientation, attenuation, and other characteristics of the structures, and may include using additional information (such as atlases, models of shape and orientation) from atlas or prior information from other sources. It should be noted that, the information related to the structures may be correlated in three-dimensional space. In one embodiment, structures that are found to correspond to the same 3D location in the imaged volume are removed and/or processed as described in more detail below.

As mentioned above, structures to be removed from the projection images may also include edges and similar image elements that may lead to artifacts in the reconstruction if not managed properly. Edge detection, and other techniques for image processing may be used to identify this type of structures within the projection images and/or the initial reconstructed dataset.

In certain embodiments, identification of structures may comprise several processing elements, where for example one element focuses on finding the location of the structure, and another element focuses on characterizing the structures in terms of shape, thickness, attenuation, and so forth. As will be appreciated by one skilled in the art, these different processing elements may act on the reconstruction where the different elements may also require the use of different reconstruction algorithms to perform optimally, and/or on some or all of the projection images. For example, one reconstruction comprising a high-pass filtering step may be used primarily for localizing a structure, while another reconstruction may be more useful in determining the attenuation properties of the structure. As another example, for a structure with a known composition/attenuation, its thickness may be estimated from the projection images by evaluating the local decrease in X-ray intensity at the detector at the location where the structure appears in the projection image. The information from these processing elements is suitably combined, and the structures are thus identified. It should be noted that, several different types of structures may be managed and/or identified at the same time. Alternatively, by iterating through the whole process, one or more specific types of structures may be managed and/or identified at each iteration.

Figure 4:
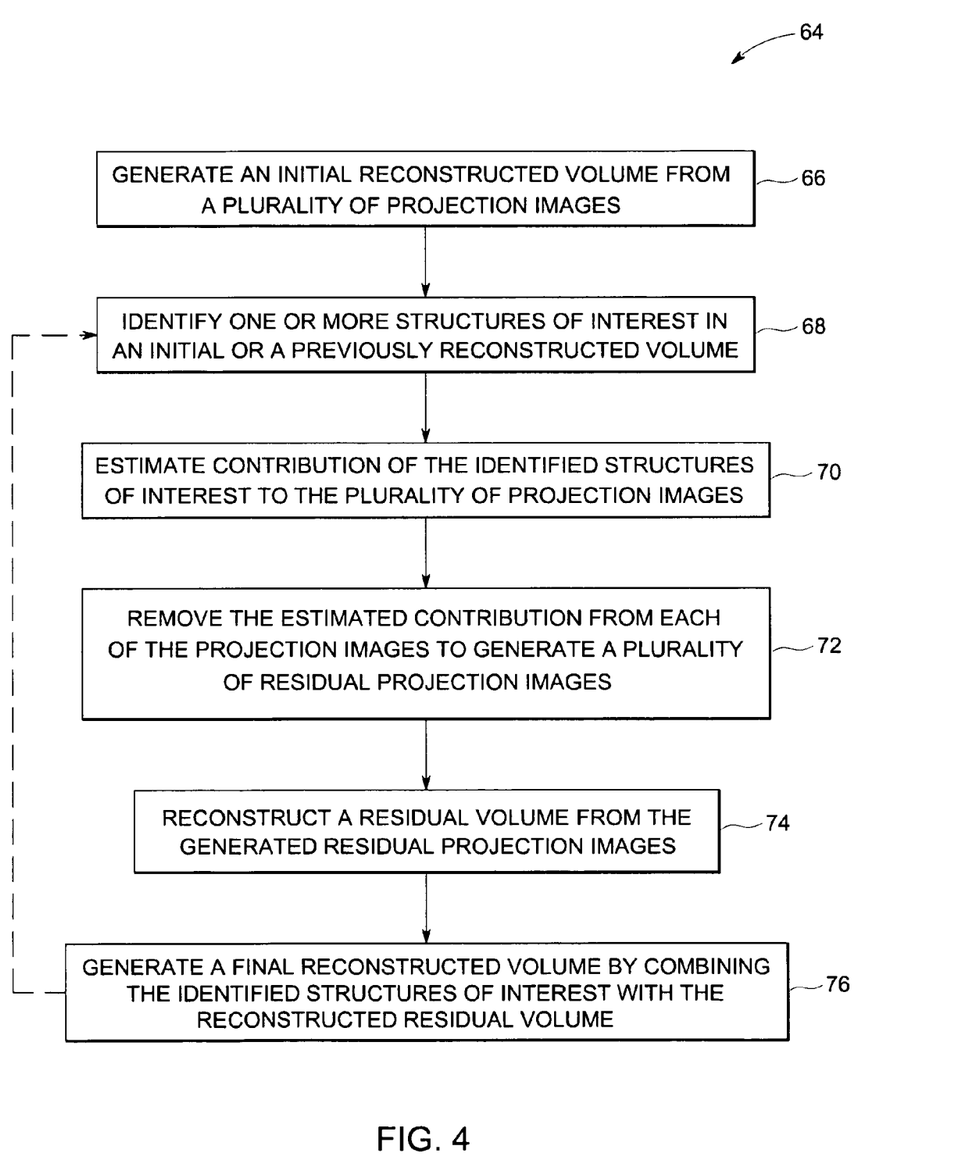
FIG. 4 is a flowchart illustrating a process for anatomy based reconstruction in accordance with another aspect of the present technique.

As noted above, the contribution of the identified structures of interest or the reconstructed volume to the projection images may be estimated (as depicted by step 70 of FIG. 4 and step 80 of FIG. 5) and the estimated contribution may then be removed from each projection image to generate the one or more residual images (as depicted by step 72 of FIG. 4 and step 82 of FIG. 5). The knowledge of the imaging system modality, such as imaging system geometry, tube and detector characteristics, and so forth, may be leveraged while computing an optimal estimate of the contribution of the identified structures to the projection images as well as in the other processing steps. In one embodiment, simple line-integrals of the attenuation coefficients through the identified structures may be used, and their respective contribution to the projection images may be subtracted from the projection images. In another embodiment, the line integrals of the "differential attenuation coefficient" may be used, where the differential attenuation coefficient is the difference of the structure's attenuation coefficient to the attenuation coefficient of the tissue surrounding the structure. By using the differential attenuation coefficient, the structure is "invisible" in the projection images after being extracted or removed. In yet another embodiment, the outline of the projected structure in the projection image is set to zero, followed by an optional interpolation step that fills the "hole" in the data. As will be appreciated by one skilled in the art, other methods of estimating the contribution of the identified structures or reconstructed volume to the projection images, and extracting or removing the estimated contributions from the projection images is well within the scope of the present techniques.

In another embodiment, instead of removing the contribution of the structures from the projection images, the corresponding regions in the image may be given a lower weight, or lower confidence level, than the other regions of the projection images. In that way the "removal" or management of these structures can be integrated into the reconstruction step. Pixel values with a low weight, or low confidence level, have a highly reduced potential to generate artifacts in the reconstruction, than pixel values with a high weight, or a high confidence value. Combinations of these different approaches are of also within the scope of the present techniques.

In certain embodiments, the residual projection images may be generated by forward projecting the structures of interest identified within the reconstructed volume or forward projecting the retained volume to estimate the contribution of the structures or the reconstructed volume respectively for each of the plurality of projection images and removing the respective contribution from the respective projection images. This may include processing the retained volume by segmentation, filtration, thresholding, quantization, edge detection or other image processing techniques.

Once a set of residual projection images is formed by removing the contribution of the identified structures from the projection images, a reconstruction algorithm may be applied to the residual projection images, as depicted by step 74 of FIGS. 4 and 5. As one skilled in the art will appreciate, the reconstruction algorithm may be selected and/or optimized with respect to the subsequent processing steps. For example, if another set of structures needs to be identified a reconstruction algorithm may be applied that facilitates such identification. Similarly, if the reconstruction step is the final reconstruction step before visualization by a clinician or evaluation by a CAD program a reconstruction algorithm may be used that produces a reconstruction suitable for such visualization and/or evaluation. As noted above, the reconstructed volume obtained from this reconstruction step may be combined with the identified structures of interest or the reconstructed volume from previous steps to obtain the final reconstructed volume (as depicted by step 76 FIG. 4 and step 84 of FIG. 5). In one embodiment, combination of the reconstructed volume with the identified structures of interest or the previously reconstructed volume may be achieved via a simple summation. The final reconstructed volume may then be evaluated by a clinician or via a CAD system to generate a diagnosis. Alternatively, the CAD algorithm may be applied on the residual projection images or the residual volume for generating diagnosis.

The techniques as described in various embodiments mentioned above include an iterative reconstruction method where portions or regions of the reconstructed volume are segmented and the segmentation results are leveraged in the subsequent iteration steps. The anatomy based reconstruction as described above generates a 3-dimensional tomographic dataset by performing a sequence of reconstruction steps, where each reconstruction step may be optimized for reconstructing, or identifying, only a part or some aspect of the imaged anatomy. Prior to subsequent reconstruction steps, the already reconstructed anatomy may be removed or extracted from the projection images. In other words, the imaged anatomy may be leveraged in the course of the reconstruction. This approach leads to high-quality, low-artifact reconstructions, and allows incorporating prior knowledge about anatomy shape (e.g., using models or atlases). The present technique may therefore be used to substantially improve image quality and make the results clinically more useful. Further, if the imaged object is moving/deforming (for example, due to patient motion), the motion may be estimated by identifying structures in the projection images or in the initial reconstructed volume and estimating the deformation from the displacement of the identified structures. The estimated motion may be then used for generating a high-quality motion-corrected reconstruction volume in subsequent reconstruction steps.

The anatomy based reconstruction techniques as described in various embodiments discussed above may find application in a wide range of applications. For example, in mammography, calcifications may be one of the structures of interest. In a first step, a reconstruction may be performed with an OSBP type backprojection for artifact management. The calcifications may be identified in the reconstructions by using a thresholding operator. The thickness of the calcifications can be either estimated from the reconstructed dataset, from the local intensity difference in the projection images at the location of the calcification (in conjunction with the known attenuation factor), or by using an isotropy assumption (i.e., the calcification is assumed to be approximately spherical). Using this knowledge, the contribution of the calcification to the projection images may be approximately removed. In subsequent steps, a reconstruction algorithm is applied to the residual projection images, and the previously identified calcifications are added to the obtained reconstructed volume to generate a final volume. Similarly, in interventional imaging, surgical tools, fiducial markers and catheters that are in the field of view may be managed, and artifacts due to these tools may be minimized. In particular, 3D models of the tools may be leveraged to optimally identify their location in the imaged volume, and minimize their impact on 3D image quality.

By way of further example, the anatomy based reconstruction techniques as described in various embodiments discussed above may be applied in RAD tomosynthesis where ribs can cause severe out-of-plane artifacts. In particular, the edges of ribs may contribute to these artifacts. Similar to the previous example, a first reconstruction step may be performed, using high-pass filtering (preferentially in a direction orthogonal to the orientation of the ribs) and artifact management may be done with an OSBP type backprojection. From the reconstruction, the 3D location of the ribs may be identified by applying an edge detector to the image tuned to the expected orientation and low curvature of the ribs. Once the edges are identified, either the full rib volume may be estimated, and the contribution to the projections can be removed, or just the sharp edge-structures that are associated with the ribs may be removed from the projection images. Estimating the contribution of these structures to the projection images may involve another reconstruction step, and/or suitable processing steps acting on the projection images. In subsequent steps, a reconstruction algorithm may be applied to the residual projection images. Since in RAD the focus is often in visualizing the lung, it may not even be needed to combine the reconstruction with the previously identified ribs, although such a combination is possible. Since the ribs or rib-edges were essentially removed from the projection images, the artifacts due to the ribs will be minimized in the second reconstruction step that uses the residual projections as input.

Similar to internal structures that were discussed previously, image artifacts attributable to the skinline, as well as other effects, may also be managed by using the present techniques. For the skinline, one approach may be to identify the skinline in a reconstruction in one stage, and then remove the skinline in the projections by 'filling in' the air region around the imaged anatomy with tissue of average attenuation characteristics, and adding the contribution of that tissue to the projection images. Similarly artifacts attributable to bones, organs, implants, or other structures may be minimized by the present techniques.

While the applications of the present techniques are described in the context of a tomosynthesis system for mammography or RAD, the present techniques are applicable to a wide range of other applications. For example, the anatomy based reconstruction described in the various embodiments discussed above may be applied to tomosynthesis or limited angle imaging of joints (knee, elbow, wrist) or other human body parts, imaging of animals, as well as non-medical applications such as non-destructive evaluation (NDE) or baggage-screening.

The embodiments illustrated above may comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources.

In the context of the present technique, the computer-readable medium may be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for anatomy based reconstruction, the method comprising:
   identifying one or more structures of interest in a plurality of projection images;
   generating a plurality of residual projection images based on the one or more structures of interest; and
   reconstructing a residual volume from the plurality of residual projection images;
   wherein identifying the one or more structures of interest comprises reconstructing at least one initial reconstructed volume from two or more of the plurality of projection images, and wherein generating the plurality of residual projection images comprises forward projecting the at least one initial reconstructed volume to estimate a contribution of the at least one initial reconstructed volume for each of the plurality of projection images and removing the respective contribution from the respective projection image.

2. The method of claim 1, wherein identifying the one or more structures of interest comprises locating the structures of interest and/or characterizing the structures of interest.

3. The method of claim 2, wherein characterizing the structures of interest comprises estimating size, shape, orientation and attenuation of the structures of interest.

4. The method of claim 1, wherein generating the plurality of residual projection images comprises estimating a contribution of the one or more structures of interest for each of the plurality of projection images and removing the respective contribution from the respective projection image.

5. The method of claim 4, wherein estimating the contribution and/or removing the respective contribution comprises using additional information from an atlas and/or prior information from other sources about characteristics of the one or more structures of interest, wherein the characteristics include at least one of a size, a shape, a orientation, and/or a attenuation of the structure of interest.

6. The method of claim 4, wherein estimating the contribution comprises accounting for at least one of an imaging modality or an imaging technique associated with acquisition of the plurality of projection images.

7. The method of claim 1, wherein generating the plurality of residual projection images comprises at least one of assigning lower weights to regions corresponding to the structures of interest, assigning lower confidence values to regions corresponding to the structures of interest, setting regions corresponding to the structures of interest to zero, and/or interpolating projection images within regions corresponding to the structures of interest.

8. The method of claim 1, wherein the at least one initial reconstructed volume is processed by at least one of filtration, thresholding, quantization, edge detection, or other image processing techniques.

9. The method of claim 1, wherein estimating the contribution of the initial reconstructed volume comprises accounting for at least one of an imaging modality or an imaging technique associated with acquisition of the plurality of projection images.

10. The method of claim 1, wherein identifying the one or more structures of interest comprises identifying the one or more structures of interest within the initial reconstructed volume.

11. The method of claim 10, wherein identifying the one or more structures of interest comprises applying at least one of segmentation, filtration, thresholding, quantization, edge detection, atlas-based registration or other image processing techniques.

12. The method of claim 10, wherein identifying the one or more structures of interest comprises applying at least one of atlas-based segmentation, model-based segmentation or other techniques that utilize prior information about the expected anatomical shape or other characteristics of the imaged anatomy.

13. The method of claim 10, wherein identifying the one or more structures of interest comprises using additional information from an atlas and/or prior information from other sources about characteristics of the one or more structures of interest, wherein the characteristics include at least one of a size, a shape, a orientation, and/or a attenuation of the structure of interest.

14. The method of claim 10, wherein generating the plurality of residual projection images comprises forward projecting the one or more structures of interest.

15. The method of claim 1, wherein identifying the one or more structures of interest comprises performing a three-dimensional to two-dimensional registration.

16. The method of claim 15, wherein performing the three-dimensional to two-dimensional registration comprises registration of an atlas to the plurality of projection images.

17. The method of claim 1, wherein identifying the one or more structures of interest comprises identifying the one or more structures of interest based on two-dimensional image processing techniques.

18. The method of claim 17, wherein the two-dimensional image processing techniques comprises segmentation, filtration, thresholding, quantization, edge detection or other image processing techniques.

19. The method of claim 17, wherein identifying the one or more structures of interest comprises applying at least one of atlas-based segmentation, model-based segmentation or other techniques that utilize prior information about the expected anatomical shape or other characteristics of the imaged anatomy.

20. The method of claim 17, wherein identifying the one or more structures of interest comprises using additional information from atlas and/or prior information from other sources about characteristics of the one or more structures of interest, wherein the characteristics include at least one of a size, a shape, a orientation, and/or a attenuation of the structure of interest.

21. The method of claim 1, further comprising iterating the steps of identifying the one or more structures of interest, generating the plurality of residual projection images, and reconstructing the residual volume.

22. The method of claim 1, further comprising generating a final reconstructed volume by combining the one or more structures of interest and the residual volume.

23. The method of claim 1, further comprising applying a CAD algorithm to the plurality of residual projection images, the residual volume, and/or the final reconstructed volume to generate a diagnosis.

24. An imaging system, comprising:
   a processor configured to identify one or more structures of interest in a plurality of projection images, to generate a plurality of residual projection images based on the one or more structures of interest, and to reconstruct a residual volume from the plurality of residual projection images;
   wherein the processor identifies the one or more structures of interest and reconstructs at least one initial reconstructed volume from two or more of the plurality of projection images, and wherein the processor generates the plurality of residual projection images by forward projecting the at least one initial reconstructed volume to estimate a contribution of the at least one initial reconstructed volume for each of the plurality of projection images and removes the respective contribution from the respective projection image.

25. The imaging system of claim 24, wherein the processor is configured to iterate the steps of identifying the one or more structures of interest, generating the plurality of residual projection images, and reconstructing the residual volume.

26. The imaging system of claim 24, wherein the processor is configured to generate a final reconstructed volume by combining the one or more structures of interest and the residual volume.

27. The imaging system of claim 24, wherein the processor is configured to evaluate the plurality of residual projection images, the residual volume and/or the final reconstructed volume to generate a diagnosis.

28. The imaging system of claim 24, further comprising:
a source of radiation for producing X-ray beams directed through an imaging volume from a plurality of viewpoints; and
a detector adapted to detect the X-ray beams and to generate signals representative of the plurality of projection images corresponding to the respective viewpoints.

29. A non-transitory computer readable media with an executable program configured to operate on a processor, the program comprising:
routines for identifying one or more structures of interest in a plurality of projection images;
routines for generating a plurality of residual projection images based on the one or more structures of interest; and
routines for reconstructing a residual volume from the plurality of residual projection images;
wherein the processor identifies the one or more structures of interest and reconstructs at least one initial reconstructed volume from two or more of the plurality of projection images, and wherein the processor generates the plurality of residual projection images by forward projecting the at least one initial reconstructed volume to estimate a contribution of the at least one initial reconstructed volume for each of the plurality of projection images and removes the respective contribution from the respective projection image.

* * * * *